United States Patent [19]

Faith

[11] 4,194,823
[45] Mar. 25, 1980

[54] ARRANGEMENT OF A PHOTOGRAPHIC CAMERA HAVING TWO DEVIATING MIRRORS

[75] Inventor: Günter Fauth, Unterhaching, Fed. Rep. of Germany

[73] Assignee: AGFA-Gevaert, A.G., Leverkusen, Fed. Rep. of Germany

[21] Appl. No.: 885,073

[22] Filed: Mar. 9, 1978

[30] Foreign Application Priority Data

Mar. 10, 1977 [DE] Fed. Rep. of Germany ...... 2710439

[51] Int. Cl.² ............... G03B 17/50; G03B 15/00; G03B 13/08
[52] U.S. Cl. ..................... 354/150; 354/86; 354/224
[58] Field of Search ............ 354/83, 86, 192–194, 354/219, 187, 150, 152, 155, 224, 225

[56] References Cited

U.S. PATENT DOCUMENTS 2,531,783 11/1950 Mosca .................................. 354/150
3,592,115 7/1971 Ando .............................. 354/150 X

FOREIGN PATENT DOCUMENTS 906337 5/1945 France ..................................... 354/224

*Primary Examiner*—Donald A. Griffin
*Attorney, Agent, or Firm*—Michael J. Striker

[57] ABSTRACT

An arrangement of a photographic camera, preferably an instant-picture print camera having two light reflecting mirrors between the objective and a rectangular film strip. According to this invention, the angular position between the mirrors is adjusted such that at least one section of the path of travel of light rays between the objective and the large mirror assigned to the film strip forms an oblique angle with an edge of the film strip.

1 Claim, 18 Drawing Figures

ARRANGEMENT OF A PHOTOGRAPHIC CAMERA HAVING TWO DEVIATING MIRRORS

BACKGROUND OF THE INVENTION

The invention relates generally to photographic cameras having two deviating mirrors for the beam of light rays travelling between the objective and the film, wherein the mirror assigned to the film is inclined relative to the film plane.

In known camera structures of the above type, the two deviating mirrors are either inclined relative to each other to form a roof-like configuration or are arranged parallel to each other with facing reflecting surfaces. These known structures have the common feature that the mirrors are inclined in planes that extend parallel to the edges of the rectangular film strip upon which an image is reflected. In addition, in prior-art cameras of this kind care has been taken that the optical axis of the portion of the path of travel of the light that is not perpendicular to the film strip, be directed parallel to one edge of the film strip. This known arrangement results in a box-like appearance of the camera housing that is only alleviated by the presence of a projecting objective or, as the case may be, the presence of a prism structure.

SUMMARY OF THE INVENTION

It is an object of this invention to provide a new arrangement in the camera having two reflecting mirrors which substantially increases the possibility to diversify the design, configuration and appearance of camera housings to meet different operational and aesthetic requirements.

Another object of this invention is to make the camera more compact, especially the instant-print camera having a relatively large size of images.

Still another object of this invention is to facilitate the manipulation of the camera.

According to this invention, the above objects, and others which will become apparent hereafter, are attained by arranging the deviating mirrors relative to the objective and the rectangular film strip in such a manner that at least one section of the path of travel of the reflected light rays is oblique relative to edges of the film strip.

By means of this arrangement there result not only new possibilities for structural modifications of the housings of the camera, but also new operational possibilities as far as the convenience of manipulation is concerned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3a–10a show schematically configurations of camera housing corresponding to the arrangements in FIGS. 3–10.

DESCRIPTION OF THE PREFERRED EMBODIMENTS

Figure 1:
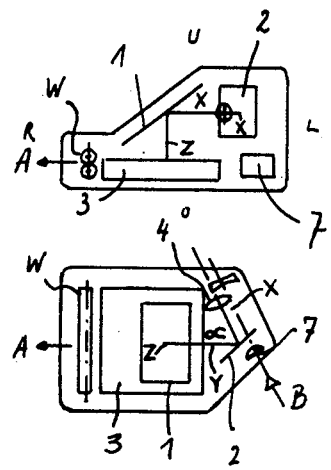
FIG. 1 is a schematic view in two orthogonal planes of one embodiment of the camera according to this invention wherein the path of travel of the light rays between the objective and the assigned mirror is oblique relative to the edges of the film strip.

In each Figure, there is shown in two orthogonal views the path of travel of the light rays or the resulting configuration of the camera housing. Reference numeral 1 denotes a large light deviating mirror that is inclined relative to the film strip 3, whereas the smaller deviating mirror 2 is assigned to the objective 4. The upper surface of the rectangular film strip 3 defines an image plane 3a. In the drawings, the orientation mark O denotes the top of the camera, U denotes the bottom, R indicates the right-hand side, and L the left-hand side of the camera when related to the normal operational position of the camera in the direction of view of the operator. This viewing direction is designated by arrow B at the viewfinder 7. In instant-picture print cameras the direction or discharge of the prints is also of importance and is designated with arrow A. The polaroid or instant-print film strip 3 has its broad marginal portion 3c that contains a developer pouch directed against the developing rollers W.

Figure 2:
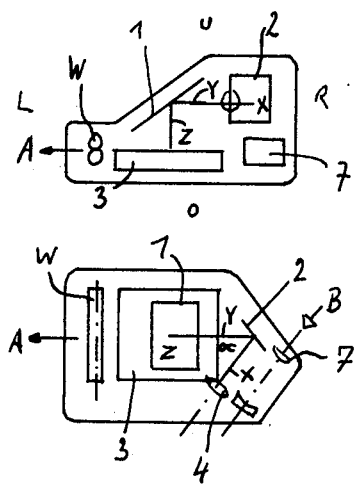
FIG. 2 is a modification of FIG. 1.

In the embodiments according to FIGS. 1 and 2, the camera housing includes a film cassette containing the film strip 3 disposed in a cassette. Above the film strip 3 is mounted at an inclined position thereto a large light deviating mirror 1 communicating via a smaller light deviating mirror 2 with the objective 4. The deviating mirror 2 is so arranged relative to the film strip 3 or its rectangular cassette that a part of the projected optical axis X,Y,Z of the path of travel of light rays which are emanating from the objective, forms with the edges of the film strip 3 or with the rectangular cassette for the film strip 3 an oblique angle $\alpha$. The optical axis of the viewfinder 7 has the same direction as the path of light rays passing through the objective 4. It will be noted that in both Figures, the orientation marks O, U, R and L denote an orientation of the camera which is different from the orientation shown in the drawing.

Figure 3:
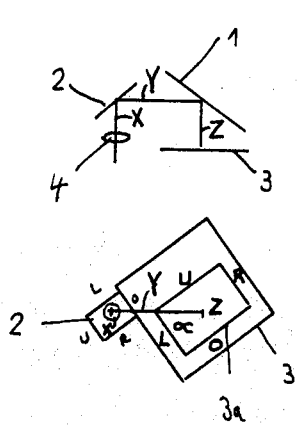
FIGS. 3–10 show schematically in two orthogonal planes further modifications of the arrangement of the deviating mirrors, the objective and the film strip according to this invention.
Figure 3A:
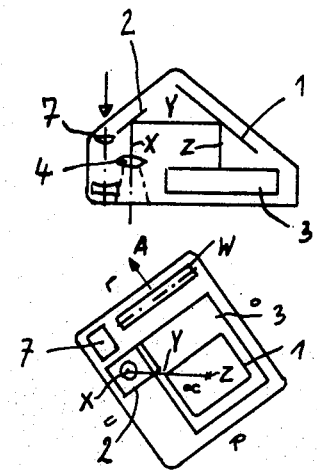
Figure 4:
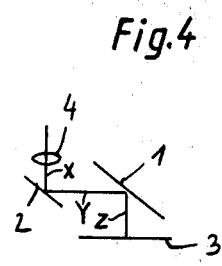
Figure 4A:
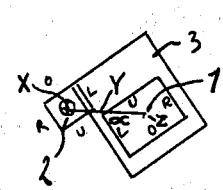
Figure 5:
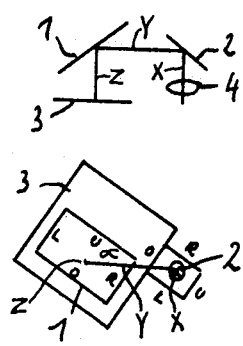
Figure 5A:
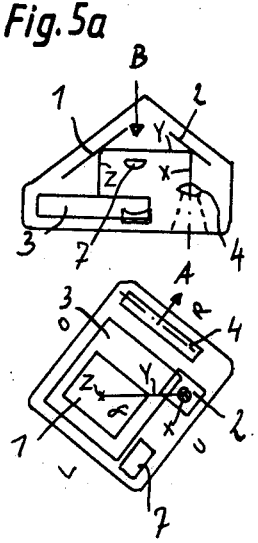

In the embodiment according to FIG. 1, a picture print is discharged in the direction A to the right and transversely at an oblique angle $\alpha$ to the direction B of viewing corresponding to the part X of the polygonal optical axis X,Y,Z. In FIG. 2, the direction of the film discharge A corresponding to the part Y of the axis X,Y,Z takes place to the left from the direction B of viewing corresponding to the part X and forms therewith the oblique angle $\alpha$. As seen from the schematic diagrams in FIGS. 3–10 or in the embodiments of FIGS. 3a–10a, the large mirror 1 is inclined relative to the image plane 3a and about the oblique angle $\alpha$ to one edge of the film strip 3. It is the position of the large mirror 1 relative to an edge of the film strip 3 that determines the relationship between the direction B of viewing and the direction A of the discharge of the film prints. According to FIG. 3a, the film print is discharged to the left; according to FIG. 4a upwardly; according to FIG. 5a to the right; and according to FIG. 6a again upwardly, and so on.

Whereas in FIGS. 3, 5, 7 and 9 the deviating mirrors 1 and 2 are arranged relative to each other in a roof-like manner, the arrangement according to FIGS. 4, 6, 8 and 10 is parallel.

Figure 6:
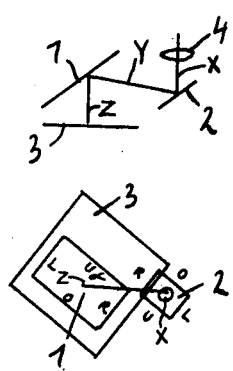
Figure 6A:
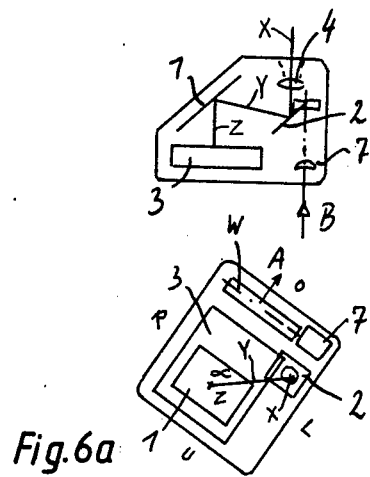
Figure 7:
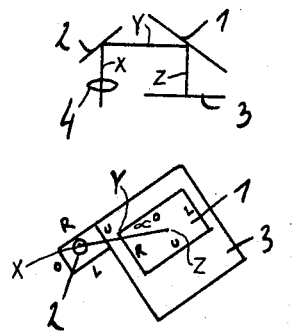
Figure 7A:
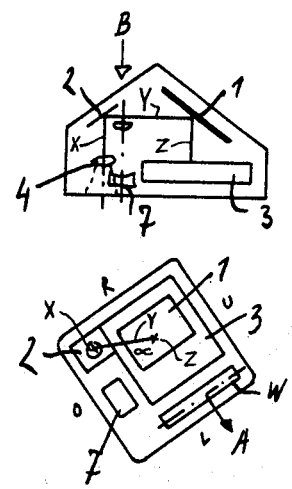
Figure 8:
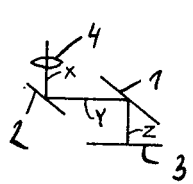
Figure 8:
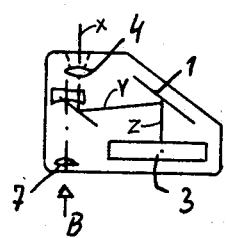
Figure 8:
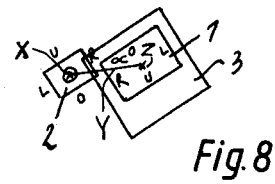
Figure 8A:
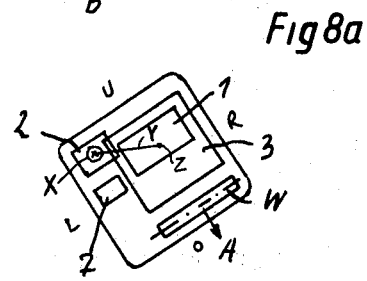
Figure 9:
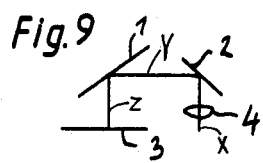
Figure 9A:
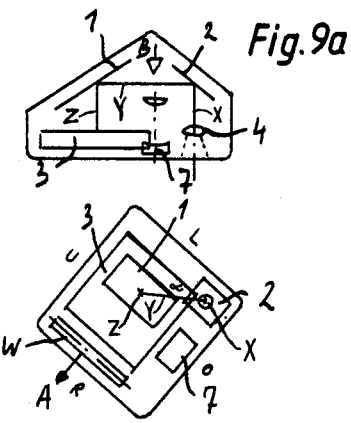
Figure 10:
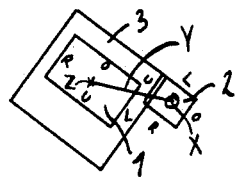
Figure 10:
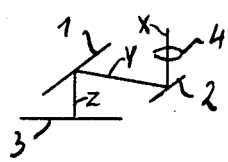
Figure 10:
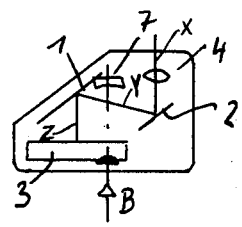
Figure 10:
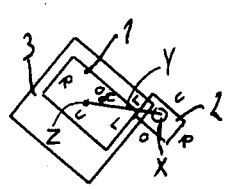
Figure 10A:
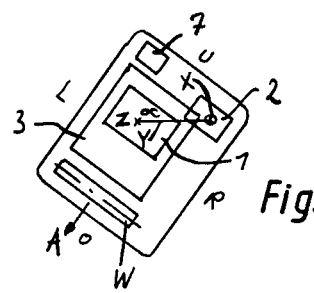

In the embodiments according to FIGS. 6a, 8a and 12a the part of the path of travel of the light rays between the mirrors 1 and 2 is inclined relative to the film plane and this arrangement results in a further reduction of size of the camera housing provided with an objective 4 having a constant cross-section.

As can be recognized from the remaining Figures, there are numerous possibilities for modifying the design of the camera housing according to different arrangements of the deviating mirrors devised in accordance with the teaching of this invention.

Moreover, the large mirror 1 facing the film strip can be inclined relative to the film plane in an arbitrary position without regard to the diagonal symmetry with the film strip 3. Of course, excessively flat angles should be avoided due to their effect upon the size of the reflecting surfaces of the mirrors. Furthermore, the shape of the mirrors does not need to be rectangular as illustrated in the drawings, but may be adjusted to the reflected beam of light rays and may have a trapezoidal cross-section for instance.

Furthermore, it is also possible to employ prisms instead of mirrors, to modify existing conventional cameras to have a polygonal path of travel of light rays whereby a section of this path is inclined relative to the edges of the film strip. The application of this invention, however, is most advantageous in instant-print cameras due to their inherent problems related to the large size of their pictures.

Furthermore, it is also possible to combine the embodiments of FIGS. 1 and 2 with those as shown in the remaining Figures. In this manner, a combination would result where the mirror 2 facing the objective is oblique relative to an edge of the film strip and the large mirror 1 is oriented approximately perpendicularly to the image plane.

Without further analysis, the foregoing will so fully reveal the gist of the present invention that others can, by applying current knowledge, readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A photographic camera having a camera body; an objective in one wall of the camera body; and means for supporting a rectangular film strip disposed inside the camera body, comprising a first light deviating member arranged inside said camera body at an inclined position above the film strip, and a second light deviating member arranged at an inclined position behind said objective for reflecting light rays from said objective to said first deviating member, the mutual relative positions of said first and second deviating members and said objective being adjusted for directing at least one section of the optical axis of the polygonal path of travel of light rays in the camera at an oblique angle relative to the edges of said film strip; and the reflecting surfaces of said first and second deviating members extending parallel to each other.

* * * * *